United States Patent
Knutsson

(10) Patent No.: US 9,139,345 B2
(45) Date of Patent: Sep. 22, 2015

(54) VALVE ASSEMBLY INTENDED FOR USE TOGETHER WITH A PALLET CONTAINER AND A LINER

(75) Inventor: Anders Knutsson, Fjalkinge (SE)

(73) Assignee: PERSTORP AB, Perstorp (SE)

( * ) Notice: Subject to any disclaimer, the term of this patent is extended or adjusted under 35 U.S.C. 154(b) by 0 days.

(21) Appl. No.: 14/238,389

(22) PCT Filed: Aug. 24, 2012

(86) PCT No.: PCT/SE2012/000122
§ 371 (c)(1),
(2), (4) Date: Apr. 24, 2014

(87) PCT Pub. No.: WO2013/032382
PCT Pub. Date: Mar. 7, 2013

(65) Prior Publication Data
US 2014/0231689 A1     Aug. 21, 2014

(30) Foreign Application Priority Data

Aug. 29, 2011   (SE) .................................. 1100626-9

(51) Int. Cl.
| | |
|---|---|
| *B65D 77/06* | (2006.01) |
| *F16K 1/22* | (2006.01) |
| *F16K 27/00* | (2006.01) |
| *B65D 47/20* | (2006.01) |
| *F16K 1/226* | (2006.01) |

(52) U.S. Cl.
CPC .............. *B65D 77/067* (2013.01); *B65D 47/20* (2013.01); *B65D 77/061* (2013.01); *F16K 1/22* (2013.01); *F16K 1/226* (2013.01); *F16K 27/00* (2013.01)

(58) Field of Classification Search
CPC .... B65D 77/067; B65D 47/20; B65D 77/061; F16K 1/22; F16K 1/226; F16K 27/00
USPC ........... 137/269, 15.25, 315.22; 251/305–306
See application file for complete search history.

(56) References Cited

U.S. PATENT DOCUMENTS

| | | | |
|---|---|---|---|
| 3,376,014 A * | 4/1968 | Bucklet et al. ................ 251/306 |
| 3,910,552 A | 10/1975 | Hills et al. | |
| 4,717,120 A | 1/1988 | Fremow et al. | |
| 4,928,922 A * | 5/1990 | Nichols ......................... 251/180 |
| 4,932,551 A | 6/1990 | Thomas et al. | |
| 4,934,654 A | 6/1990 | Linnemann | |
| 5,797,415 A * | 8/1998 | Nicholson et al. ......... 137/15.01 |
| 6,347,718 B1 | 2/2002 | Karpisek | |

(Continued)

FOREIGN PATENT DOCUMENTS

| | | | |
|---|---|---|---|
| FR | 2605380 | | 4/1988 |
| GB | 1220141 | * | 1/1968 |

(Continued)

OTHER PUBLICATIONS

International Search Report Dated Dec. 27, 2012.

*Primary Examiner* — Marina Tietjen
(74) *Attorney, Agent, or Firm* — Novak Druce Connolly Bove+Quigg LLP

(57) ABSTRACT

A valve assembly (2) intended for use together with a pallet container (1) and a liner. The valve assembly (2) comprises a support member (6). The support member (6) is provided with a guiding hole (63) intended to interact with a lower valve guide member (11).

22 Claims, 5 Drawing Sheets

(56) References Cited

U.S. PATENT DOCUMENTS

2006/0039776 A1    2/2006   Schutz
2011/0198526 A1*   8/2011   Tappe ........................ 251/315.1

FOREIGN PATENT DOCUMENTS

| | | |
|---|---|---|
| GB | 1220141 A | 1/1971 |
| WO | WO9919220 A1 | 4/1999 |

\* cited by examiner

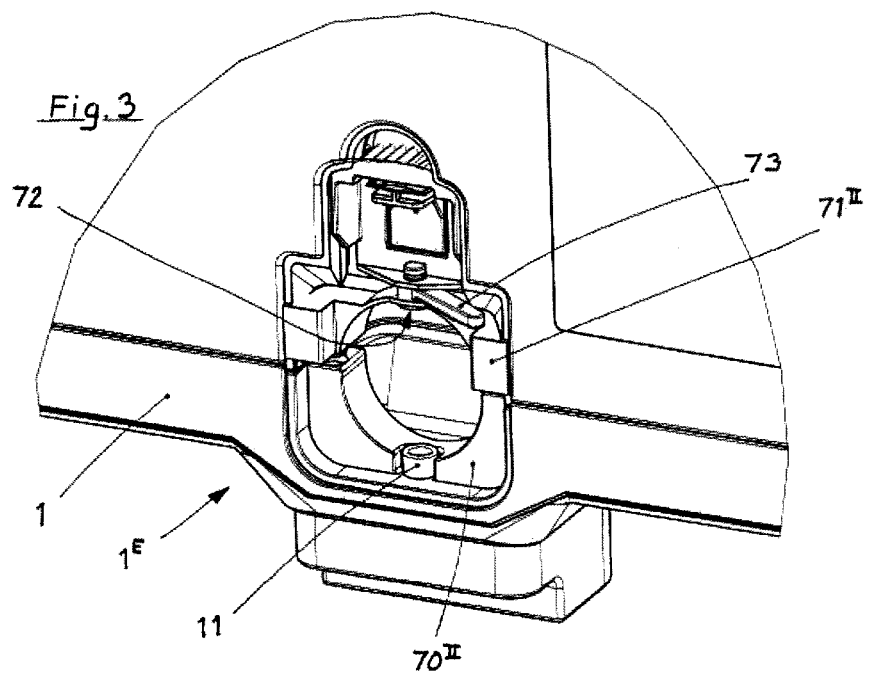
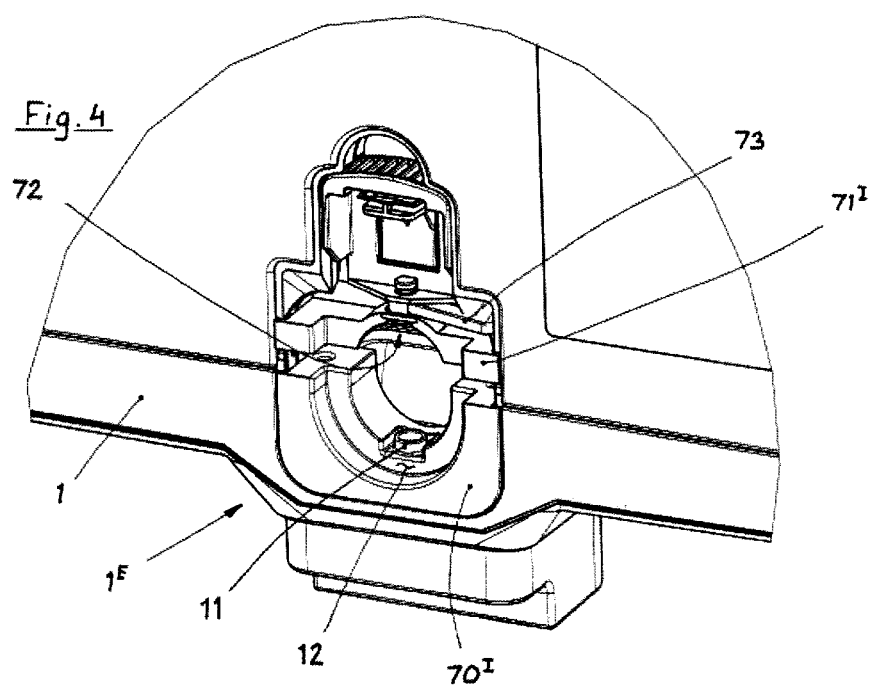

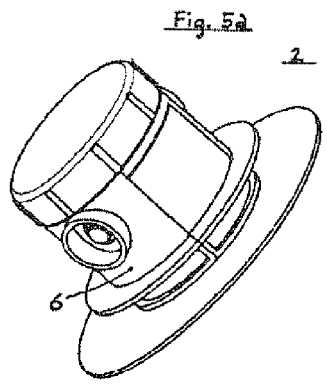
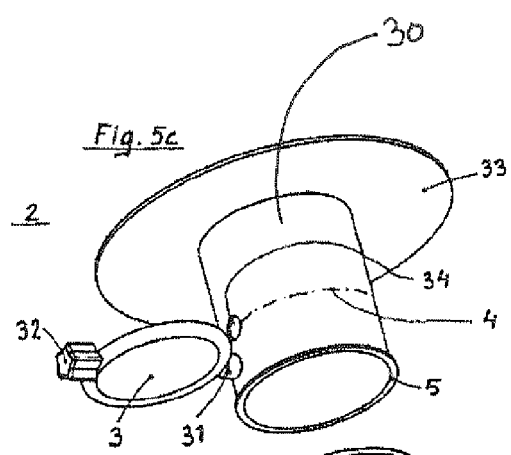
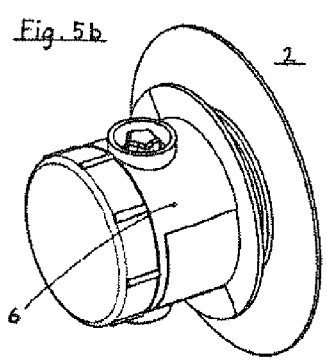
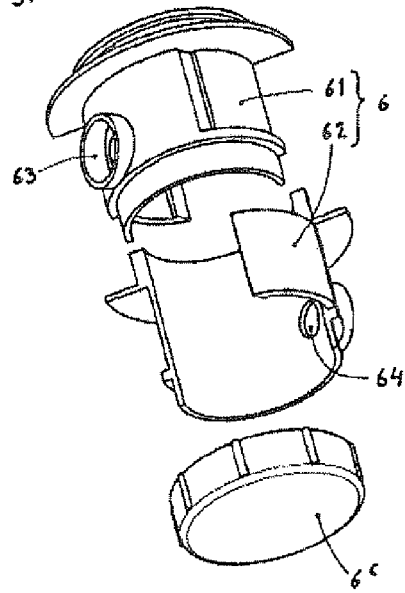

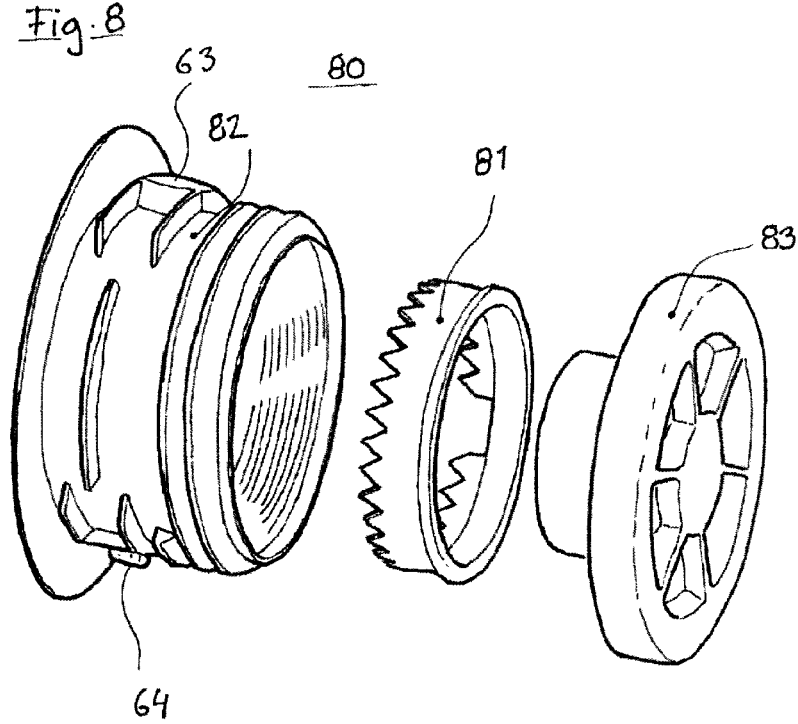

VALVE ASSEMBLY INTENDED FOR USE TOGETHER WITH A PALLET CONTAINER AND A LINER

CROSS REFERENCE TO RELATED APPLICATIONS

This application is a 35 U.S.C. §371 application of International Application PCT/SE2012/000123, filed Aug. 24, 2012, which claims priority of Swedish Patent Application No. 1100626-9, filed Aug. 29, 2011, the entire disclosures of which are herein incorporated by reference.

BACKGROUND OF THE INVENTION

1. Field of the Invention

The present invention relates to a novel and improved valve assembly for hulk containers with liner and a container thereto.

2. Description of Related Prior Art

Products made of thermoplastic materials can be manufactured by a number of different manufacturing procedures. The most commonly used methods are however, injection moulding, vacuum forming, blow moulding and press moulding.

Valves of butterfly and of ball type have been known for some time and they can be manufactured from thermoplastic material. Here injection moulding and press moulding are the most suited manufacturing methods in order to achieve the desired precision. Butterfly valves and ball valves made of thermoplastic materials are mostly used in low-pressure systems. Butterfly valves are often used in ventilation appliances where absolute closing is not necessary. It is also possible to use the valves for fluid media. It will of course be important to have gaskets both in the valve seat as well as at the end of the valve housing. These gaskets are typically made from an elastomeric material, most commonly a thermoplastic material with a plasticizer additive. In many cases, the valve is designed in such a way that material recovery is virtually impossible.

One area where such valves are frequently used is bulk goods where foldable pallet containers are provided with a hag shaped liner having a valve at the base intended for releasing the goods. This type of packaging is often used in the food industry and will therefore need attention regarding choice of material as well as hygiene. Steam sterilization of the valve area is frequently used before a container is connected to further processing and emptied. This will put some demands on the material used for making the components of the valve.

It is furthermore desirable to be able to recover packaging material after use, which has proven difficult with previous solutions.

SUMMARY OF THE INVENTION

It has through the present invention been made possible to make the manufacturing process more effective and at the same time allowing considerable improvements in mechanical characteristics.

Accordingly, the present invention relates to a valve assembly intended for use together with a pallet container and a liner. The valve assembly comprises a support member. The support member is further provided with a guiding hole intended to interact with a lower valve guide member. According to one embodiment of the invention, the valve assembly comprises a valve, a valve seal and an outer lip seal. The support member advantageously comprises a lower guide member and an upper guide member. The lower guide member interacts with lower valve guide member. According to a preferred embodiment of the invention the lower valve guide member is arranged in a valve opening on the pallet container.

The lower valve guide member is, according to one embodiment of the invention, arranged on the upper part of a valve size adapter. The valve size adapter is further provided with guide receiver on its lower part.

The valve opening of the pallet container is suitably adapted to receive different valve sizes via valve size adapters. The valve size adapters are provided with each a matching upper adapter member, which is provided with an upper valve guide member. The upper valve guide member is provided with a valve control lever.

The valve size adapters and the matching upper adapter member are moveably attached to the valve opening of the pallet container. The upper adapter member can slide from a closed position, where the lower guide member and upper guide member are locked to the pallet container and an open position where the lower guide member and upper guide member can be removed from the pallet container or positioned into the pallet container.

The valve is preferably provided with lower and upper axle ends. The lower guide member and upper guide member are provided with guiding holes intended to receive and guide the lower and upper axle ends of the valve.

The valve seal and outer lip seal preferably constitute parts of a mainly tube shaped body. The tube shaped body is further provided with a flange and holes with seals intended to receive lower and upper axle ends of the valve.

The tube shaped body is preferably made of a flexible thermoplastic material compatible with that of the liner. The flexibility is mainly obtained by making desired portions of the tube shaped body thin walled.

A suitable material for the tube shaped body is a thermoplastic material selected from the group consisting of low-density polyethylene, linear low-density polyethylene, polypropylene and polyamide.

The tube shaped body acts as a gasket and provides a seal towards the part selected from the group consisting of; valve, an outer media via an outer lip seal, a lower axle end and an upper axle end as well as a combination thereof.

The support member suitably further comprises means for attaching an outer media selected from the group consisting of; a thread, a flange and a combination thereof.

The support member provides mechanical stability and support to the tube shaped body wherein the support member is manufactured of a rigid material selected from the group consisting, of; high-density polyethylene, polypropylene, polyamide, polycarbonate, acrylonitrile butadiene styrene co-polymer, polyoxymethylene, polyalkylene terephthalate, polybutylene terephthalate and polyphenylene oxide. This rigid material may further include filler selected from the group consisting of; lime, mica, glass fibre, carbon fibre, aramide fibre and combinations thereof.

The valve itself may suitably be of the so-called butterfly type which advantageously is made of a material selected from the group consisting of; high-density polyethylene, polypropylene, polyamide, polycarbonate, acrylonitrile butadiene styrene co-polymer, polyoxymethylene, polyalkylene terephthalate, polybutylene terephthalate and polyphenylene oxide. The valve is advantageously further provided with a circumambient gasket made from a thermoplastic elastomer. This gasket is suitably moulded onto the valve in order to increase its ability to withstand the shear-force during opening and closing of the valve.

The valve outlet according to the present invention is suitably assembled by pressing the valve into the tube shaped body so that the lower and upper axle ends is positioned in the holes with seals. The axle ends may be a part of the moulded valve, but may also be one or more separate parts, which are inserted into the valve once in the proper position in the tube shaped body. The lower guide member and upper guide member are then attached around the tube shaped body so that the guiding holes receive and guide the lower and upper axle ends of the valve.

According to one embodiment of the invention, the lower guide member and upper guide member are snap-fitted over the tube shaped body. This will allow a quick disassembly without any need for special tools for material recovery purpose.

According to one embodiment of the invention the tube shaped body is provided with an annular internal grove matching the closed position of the valve. This will reduce the risk of leakage, reduce the risk of unintentional opening of the valve and also provide a tactile confirmation when closing and opening a valve. It is, according to an alternative embodiment of the invention possible to achieve a similar effect by providing the support member with an annular internal grove matching the closed position of the valve.

DESCRIPTION OF AN EMBODIMENT EXAMPLE

The invention is further described together with enclosed drawing showing a selected embodiment of the invention, wherein, FIG. 1 show, in perspective view, part of a collapsible container 1. FIG. 1 show a first embodiment of a valve assembly 2 in a valve opening $1^E$ according to the invention.

FIG. 2 show a second embodiment of a valve assembly 2 in a valve opening $1^E$ according to the invention.

FIG. 3 show, in perspective view, the embodiment of FIG. 1 before insertion of liner and valve according to the invention.

FIG. 4 show, in perspective view, the embodiment of FIG. 2 before insertion of liner and valve according to the invention.

FIG. 5a show, in perspective view as seen from below, an embodiment of a valve assembly 3 according to the invention.

FIG. 5b show, in perspective view as seen from above, an embodiment of a valve assembly 3 according to the invention.

FIG. 5c show, in perspective view and in exploded view, an embodiment of a valve assembly 3 according to the invention.

FIG. 8 show, in perspective and exploded view an alternative valve 80 according to the invention.

Figure 6:
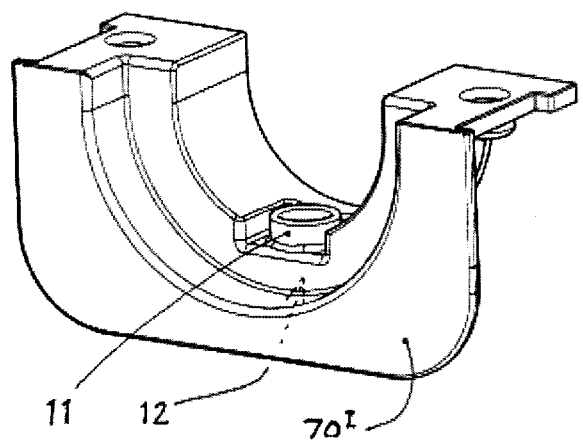
FIG. 6 show, in perspective view, a valve size adapter $70^I$ from FIG. 4.

As is understood by the accompanying figures and the text of the present application, the main purpose of the invention is to ensure that the valve is positioned correctly in the container to ensure correct and secure operation and handling of the goods. In the embodiments shown, an annular protrusion arranged at the axis of rotation of the butterfly valve at the portion facing downwards. This protrusion, identified as guiding hole 63, is to be received by another annular protrusion, identified as a lower valve guide member 11, arranged either on the base of the container or on an adapter. It should be understood that the container is adapted to receive different valve sizes hence the need for an adapter. The container is, of course provided with a lower valve guide member 11 in any circumstance. The lower valve guide member 11 of the container is then used to exactly position the adapter while the adapter in its turn is provided with a lower valve guide member 11 to guide and position the smaller valve. An embodiment of such adapter is shown in FIGS. 2 and 6 and is identified as valve size adapter $70^I$. The largest type of valve will not need an adapter and can accordingly be fitted directly on the container. The latter is evident from FIGS. 1 and 3. The exact guiding of the valve into the container will ensure correct positioning as well as making sure that the torque when operating the valve does not jeopardise the emptying of the filled liner of the container. The upper face of the valve is provided with a similar guiding means, which is clearly understood by studying the FIGS. 3, 4, 5c and 7. It is known that the valve constitutes a portion of the liner.

Figure 1:
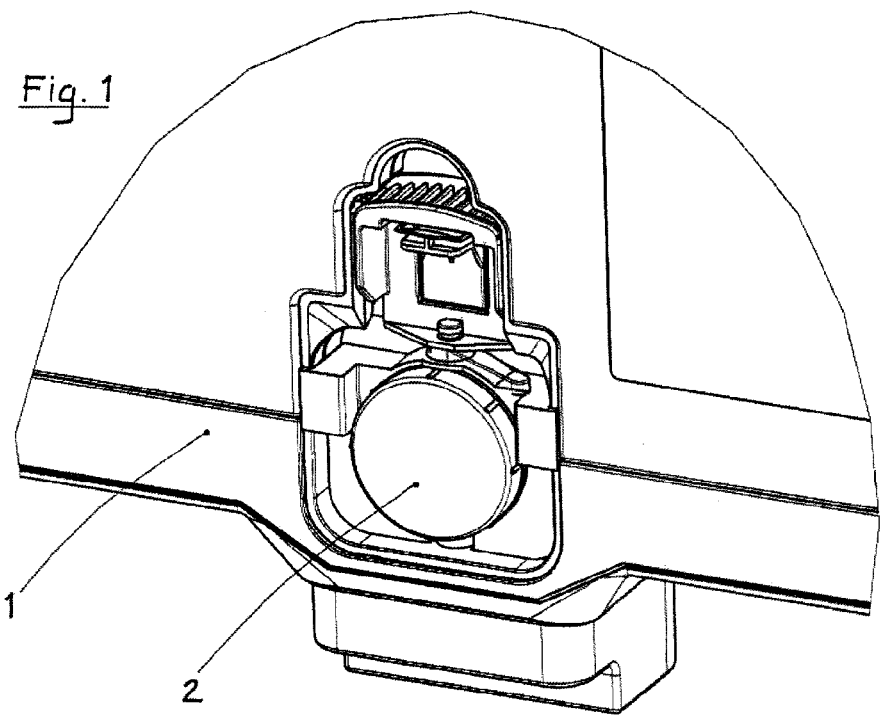
Figure 2:
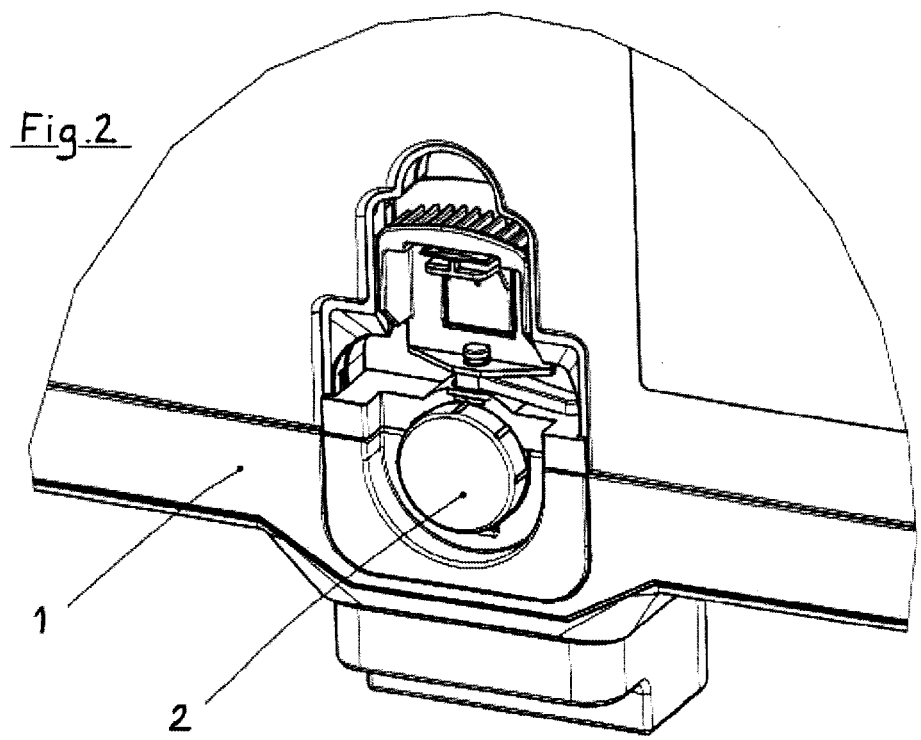
FIG. 2 show, in perspective view, part of a collapsible container 1.

Accordingly, FIGS. 1 and 2 show, in perspective view, part of a collapsible container 1. The valve assembly 2 (see also FIG. 5 a-c) is intended for use together with a pallet container 1 (only parts shown) and a liner (not shown). A liner is, in the light of the present invention understood as a flexible, closed bag of two or more layers of polyethylene film. The liner bag is usually provided with a closable opening at the top for filling and a closable opening at the bottom for emptying.

As best viewed in FIG. 5 a-c, the valve assembly 2 comprises a valve 3, a valve seal 4 and an outer lip seal 5. The valve assembly 2 further comprises a support member 6. The support member 6 comprises a lower guide member 61 and an upper guide member 62. The lower guide member 61 interacts with lower valve guide member 11 (see FIGS. 3 and 4). The valve 3 is provided with lower and upper axle ends 31 and 32 respectively. The lower guide member 61 and upper guide member 62 are provided with guiding holes 63 and 64 respectively, intended to receive and guide the lower and upper axle ends 31 and 32 respectively of the valve 3. The valve seal 4 and outer lip seal 5 constitute parts of a mainly tube shaped body 30. The tube shaped body 30 is further provide with a flange 33 and holes with seals 34 intended to receive lower and upper axle ends respectively, of the valve 3. The tube shaped body 30 is made of the same thermoplastic material type as that of the liner. The flange can then with ease be welded onto the liner itself. The latter is great advantage, which will increase productivity as well as minimize the risk for leakage, The flexibility is mainly obtained by making the desired portions of the tube shaped body 30 thin walled. The liner and the tube shaped body 30 are accordingly made from linear low-density polyethylene. The tube shaped body 30 acts as a gasket and provides a seal towards the valve 3, an outer media via an outer lip seal 5, the lower axle end 31 and the upper axle end 32. The tube shaped body 30 is further [provided with an annular internal groove matching the closed position of the valve 3. The annular internal groove is not visible in the figures, but is coinciding with the position of the valve seal 4 seen in FIG. 5c. This will reduce the risk of leakage, reduce the risk of unintentional opening of the valve 3 and also provide a tactile confirmation when closing and opening a valve 3. It is according to one alternative embodiment of the invention to [provide the annular internal groove (not shown in the figures) on the inside of support member 6, matching the closed position of the valve 3

Figure 7:
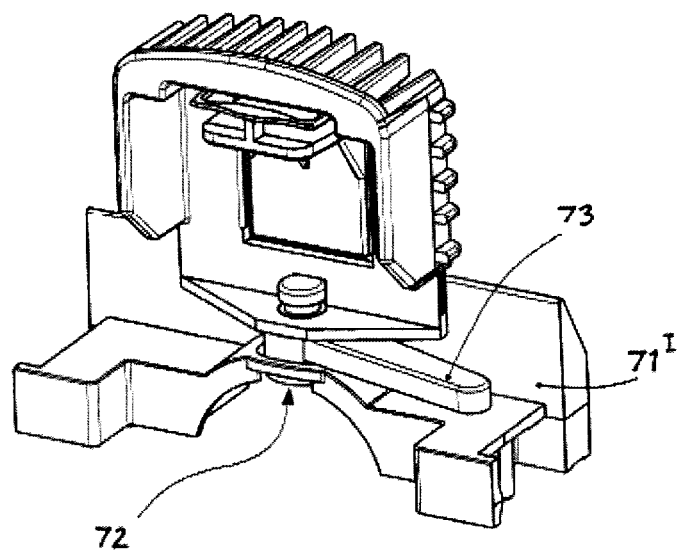
FIG. 7 show, in perspective view, a matching upper member $71^I$ from FIG. 4.

Referring now to FIG. 3 where the lower valve guide member 11 is arranged in a valve opening $1^E$ on the pallet container 1. In order to adapt the container to different sizes, as best viewed in FIG. 4, with maintained functionality the lower valve guide member 11 can be arranged on the upper part of a valve size adapter $70^I$. Please also refer to FIGS. 6 and 7 showing the valve size adapter $70^I$ and a matching upper member 71$^I$ removed from the valve opening 1$^E$. This valve size adapter 70$^I$ is provided with guide receiver 12 (not visible in the drawing) on its lower part. The valve opening 1$^E$ of the pallet container 1 is accordingly adapted to receive different valve sizes via valve size adapters 70$^I$ and 70$^{II}$ respectively. Commonly used size of valves is 2" and 3" couplings. The valve size adapters 70$^I$ and 70$^{II}$ respectively are provided with each one matching upper adapter member 71$^I$ and 71$^{II}$ respectively, which is provided with an upper valve guide member 72, the upper valve guide member being provided with a valve control lever 73. The valve size adapters 70 and 70$^{II}$ respectively, and the matching upper adapter member 71$^I$ and 71$^{II}$ respectively, are moveably attached to the valve opening 1$^E$ of the pallet container 1. The upper adapter member 71$^I$ and 71$^{II}$ respectively, can slide from a closed position, where the support member 6 with its further valve contents see FIG. 5 a-c) are locked to the pallet container 1 and an open position where said support member 6 can be removed from the pallet container 1 or positioned into the pallet container 1. The interaction between the lower valve guide member 11 and the guiding hole 63 for a larger valve as well as the interaction between the valve guide member 11, through the valve size adapter 70$^{II}$ for a smaller valve will safely secure the valve in mechanically safe and constant position.

The support member 6 further comprises means for attaching an outer media a standard thread (not shown). It is further suitable to also provide a cap 6$^C$ to protect the outer face of the valve 3 and the outer portions of the tube shaped body 30 from dirt during transport and storage.

The support member 6 provides mechanical stability and support to the tube shaped body 30. The support member 6 is manufactured of polycarbonate, which is a rigid material.

The valve outlet is assembled by pressing the valve 3 into the tube shaped body 30 so that the lower and upper axle ends 31 and 32 respectively is positioned in the holes with seals 34 whereupon the lower guide member 61 and upper guide member 62 are attached around the tube shaped body 30 so that the guiding holes 63 and 64 respectively receive and guide the lower and upper axle ends 31 and 32 respectively of the valve 3.

The lower guide member 61 and upper guide member 62 are snap-fitted over the tube shaped body 30. This will allow the assembly as well as a disassembly to be performed with ease. In cases where the liner, including the valve assembly is used for foodstuff, the liner is rarely reused due to hygiene reason. A valve assembly 2 according to the present invention is very easy to disassemble without the need for any special tools. The upper and lower guide member 61 and 62, being made from a material different from the liner bag and tube shaped body 30, can be reused, possibly after cleaning, as it will not be in direct contact with the contents of the liner bag. The material of the liner bag and the tube shaped body 30 attached thereto can be recovered.

As best viewed in FIG. 8, it is also possible to fit an alternative valve 80 in the valve opening 1E (see FIGS. 3 and 4). The alternative valve 80 comprises a valve house 82 and a cutter ring 81. The valve house 82 is attached to the liner whereby a membrane is formed. This membrane is cut by means of the cutter ring 81, which cuts an opening in the liner. Accordingly, the alternative valve 81 relies on an external valve that is possible to open and close (not shown). The positioning of the alternative valve 80 is equally important whereby the also this valve is provided with guiding holes 63 and 64 respectively. These guiding holes 63 and 64 respectively, are arranged to match the lower valve guide member 11 and the upper valve guide member 72 respectively (sec FIGS. 3 and 4). The upper adapter members 71$^I$ and 71$^{II}$ respectively (see FIGS. 3, 4 and 7) are mainly designed as shown, there is however no need for the valve control lever 73 which can be omitted when the alternative valve 80 is fitted into the container 1. During transport and storage the alternative valve 80 is advantageously provided with a cover 83.

The invention is not limited by the embodiments shown since these can be varied in different ways within the scope of the invention. It is for example possible to provide a valve assembly with a guiding hole intended to interact with a lower valve guide member.

We claim:

1. A valve assembly (2) intended for use together with a pallet container (1) and a liner, wherein the valve assembly (2) comprises a support member (6), the support member (6) being provided with a guiding hole (63) intended to interact with a lower valve guide member (11), wherein the valve assembly (2) comprises a valve (3), tube shaped body (30), a valve seal (4) and an outer lip seal (5), wherein the support member (6) is fittable over the tube shaped body (30) and comprises a lower guide member (61) and an upper guide member (62), wherein the lower guide member (61) interacts with lower valve guide member (11), wherein the lower valve guide member (11) is arranged on the upper part of a valve size adaptor (70$^I$), said valve size adaptor (70$^I$) being provided with guide receiver (12) on its lower part.

2. A valve assembly (2) according to claim 1, wherein the lower valve guide member (11) is arranged in a valve opening 1$^E$ on the pallet container (1).

3. A valve assembly (2) according to claim 1, wherein valve opening 1$^E$ of the pallet container (1) is adapted to receive different valve sizes via valve size adapters (70$^I$ and 70$^{II}$ respectively), the valve size adapters (70$^I$ and 70$^{II}$ respectively) being provided with each a matching upper adapter member (71$^I$ and 71$^{II}$ respectively) which are provided with an upper valve guide member (72), the upper valve guide member being provided with a valve control lever (73).

4. A valve assembly (2) according to claim 3, wherein the valve size adapters (70$^I$ and 70$^{II}$ respectively) and the matching upper adapter member (71$^I$ and 71$^{II}$ respectively) are moveably attached to the valve opening 1$^E$ of the pallet container (1) and that the upper adapter member (71$^I$ and 71$^{II}$ respectively) is allowed to slide from a closed position, where the lower guide member (61) and upper guide member (62) are locked to the pallet container (1) and an open position where the lower guide member (61) and upper guide member (62) can be removed from the pallet container (1) or positioned into the pallet container (1).

5. A valve assembly (2) according to claim 1, wherein the valve (3) is provided with lower and upper axle ends (31 and 32 respectively), wherein the lower guide member (61) and the upper guide member (62) are provided with guiding holes (63 and 64 respectively) intended to receive and guide the lower and upper axle ends (31 and 32 respectively) of the valve (3).

6. A valve assembly (2) according to claim 5, wherein the valve (3) is a butterfly valve.

7. A valve assembly (2) according to claim 6, wherein the support member (6) further comprise an element for attaching an outer medium; the element being selected from the group consisting of a thread, a flange and a combination thereof.

8. A valve assembly (2) according to claim 7, wherein the support member (6) is provided with an annular internal grove groove matching the closed position of the valve (3).

9. A valve assembly according to claim 7, wherein support member (6) provides mechanical stability and support to the tube shaped body (30) wherein the support member (6) is manufactured of a rigid material selected from the group consisting of high-density polyethylene, polypropylene, polyamide, polycarbonate and acrylonitrile butadiene styrene co-polymer.

10. A valve assembly (2) according to claim 6, wherein the valve seal (3) and the outer lip seal (5) constitute parts of a tube shaped body (30) that the tube shaped body (30) is further provided with a flange (33) and holes with seals (34) intended to receive lower and upper axle ends (31 and 32 respectively) of the valve (3).

11. A valve assembly (2) according to claim 5, wherein the valve seal (3) and the outer lip seal (5) constitute parts of a tube shaped body (30) that the tube shaped body (30) is further provided with a flange (33) and holes with seals (34) intended to receive lower and upper axle ends (31 and 32 respectively) of the valve (3).

12. A valve assembly (2) according to claim 11, wherein the tube shaped body (30) is made of a flexible thermoplastic material compatible with that of the liner, and that the flexibility is obtained by making desired portions of the tube shaped body (30) thin walled.

13. A valve assembly (2) according to claim 12, wherein the liner and the tube shaped body (30) is made from thermoplastic material selected from the group consisting of low-density polyethylene, linear low-density polyethylene, polypropylene and polyamide.

14. A valve assembly according to claim 12, wherein support member (6) provides mechanical stability and support to the tube shaped body (30) wherein the support member (6) is manufactured of a rigid material selected from the group consisting of high-density polyethylene, polypropylene, polyamide, polycarbonate and acrylonitrile butadiene styrene co-polymer.

15. A valve assembly (2) according to claim 14, wherein the rigid material further includes a filler selected from the group consisting of lime, mica, glass fibre, carbon fibre, aramide fibre and combinations thereof.

16. A valve assembly according to claim 12, wherein it is assembled by pressing the valve (3) into the tube shaped body (30) so that the lower and upper axle ends (31 and 32 respectively) is positioned in the holes with seals (34) whereupon the lower guide member (61) and upper guide member (62) are attached around the tube shaped body (30) so that the guiding holes (63 and 64 respectively) receive and guide the lower and upper axle ends (31 and 32 respectively) of the valve (3).

17. A valve assembly (2) according to claim 11, wherein the tube shaped body (30) acts as a gasket and provides a seal towards the part selected from the group consisting of the valve (3), an outer medium via the outer lip seal (5), the lower axle end (31) and the upper axle end (32) and combinations thereof.

18. A valve assembly (2) according to claim 17, wherein the tube shaped body (30) is provided with an annular internal grove matching the closed position of the valve (3).

19. A valve assembly according to claim 5, wherein it is assembled by pressing the valve (3) into the tube shaped body (30) so that the lower and upper axle ends (31 and 32 respectively) is positioned in the holes with seals (34) whereupon the lower guide member (61) and upper guide member (62) are attached around the tube shaped body (30) so that the guiding holes (63 and 64 respectively) receive and guide the lower and upper axle ends (31 and 32 respectively) of the valve (3).

20. A valve assembly (2) according to claim 19, wherein the lower guide member (61) and upper guide member (62) are snap fitted over the tube shaped body (30).

21. A valve assembly (2) intended for use together with a pallet container (1) and a liner, wherein the valve assembly (2) comprises a tube shaped body (30), a support member (6), the support member (6) being fittable over the tube shaped body, the support member (6) provided with a guiding hole (63) intended to interact with a lower valve guide member (11), wherein valve opening $1^E$ of the pallet container (1) is adapted to receive different valve sizes via valve size adapters ($70^I$ and $70^{II}$ respectively), the valve size adapters ($70^I$ and $70^{II}$ respectively) being provided with each a matching upper adapter member ($71^I$ and $71^{II}$ respectively) which are provided with an upper valve guide member (72), the upper valve guide member being provided with a valve control lever (73).

22. The valve assembly (2) according to claim 21, wherein the valve size adapters ($70^I$ and $70^{II}$ respectively) and the matching upper adapter member ($71^I$ and $71^{II}$ respectively) are moveably attached to the valve opening $1^E$ of the pallet container (1) and that the upper adapter member ($71^I$ and $71^{II}$ respectively) is allowed to slide from a closed position, where the lower guide member (61) and upper guide member (62) are locked to the pallet container (1) and an open position where the lower guide member (61) and upper guide member (62) can be removed from the pallet container (1) or positioned into the pallet container (1).

* * * * *